United States Patent [19]

Orr

[11] Patent Number: 5,134,406
[45] Date of Patent: Jul. 28, 1992

[54] LONG RANGE POLICE RADAR WARNING RECEIVER WITH MULTIPLE ARRAY AVERAGING

[75] Inventor: Steven K. Orr, Loveland, Ohio

[73] Assignee: Cincinnati Microwave, Inc., Cincinnati, Ohio

[21] Appl. No.: 672,053

[22] Filed: Mar. 18, 1991

Related U.S. Application Data

[63] Continuation-in-part of Ser. No. 558,668, Jul. 27, 1990, Pat. No. 5,049,885, which is a continuation of Ser. No. 481,509, Feb. 20, 1990, Pat. No. 4,954,828, which is a continuation-in-part of Ser. No. 421,525, Oct. 13, 1989.

[51] Int. Cl.$^5$ .................... G01S 7/285; G01S 7/40
[52] U.S. Cl. ................................... 342/20; 455/228
[58] Field of Search ............... 342/20; 455/226, 227, 455/228, 345

[56] References Cited

U.S. PATENT DOCUMENTS

| | | | |
|---|---|---|---|
| 3,303,335 | 2/1967 | Pryor | 364/572 |
| 3,344,349 | 9/1967 | Schroeder | 381/41 X |
| 3,399,404 | 8/1968 | Githens et al. | 342/90 |
| 3,514,585 | 5/1970 | Norsworthy | 364/604 |
| 3,573,446 | 4/1971 | Bergland | 364/726 |
| 3,622,765 | 11/1971 | Anderson | 364/575 |
| 3,646,334 | 2/1972 | Wold | 364/728.03 |
| 3,778,606 | 12/1973 | Schmitt et al. | 364/726 |
| 3,829,670 | 8/1974 | Kebabian | 364/724.1 |
| 3,925,732 | 12/1975 | Tanaka et al. | 375/94 |
| 3,997,770 | 12/1976 | Claasen et al. | 364/724.03 |
| 3,997,773 | 12/1976 | Van Essen et al. | 364/723 |
| 4,022,332 | 4/1977 | Crochiere et al. | 271/150 X |
| 4,074,264 | 2/1978 | Wilmonti | 342/90 |
| 4,075,703 | 2/1978 | Dillard | 364/734 |
| 4,099,075 | 7/1978 | Goldberg et al. | 307/352 |
| 4,209,843 | 6/1980 | Hyatt | 364/517 X |
| 4,255,791 | 3/1981 | Martin | 364/514 |
| 4,313,216 | 1/1982 | Jaeger et al. | 455/226 |
| 4,317,092 | 2/1982 | Potter | 333/165 |
| 4,386,353 | 5/1983 | Bleijerveld et al. | 342/91 |
| 4,472,785 | 9/1984 | Kasuga | 364/718 |
| 4,553,221 | 11/1985 | Hyatt | 364/728.03 |
| 4,581,769 | 4/1986 | Grimsley et al. | 455/226 |
| 4,626,857 | 12/1986 | Imazeki | 342/20 |
| 4,630,054 | 12/1986 | Martinson | 342/20 |
| 4,668,952 | 5/1987 | Imazeki et al. | 342/20 |
| 4,723,125 | 2/1988 | Elleaume | 342/194 |
| 4,750,215 | 6/1988 | Biggs | 455/226 |
| 4,772,889 | 9/1988 | Elleaume | 342/194 |
| 4,780,720 | 10/1988 | Watts | 342/91 |
| 4,811,263 | 3/1989 | Hedley et al. | 364/724.13 |
| 4,811,362 | 3/1989 | Yester, Jr. et al. | 375/75 |
| 4,862,175 | 8/1989 | Biggs et al. | 342/20 |
| 4,929,954 | 5/1990 | Elleaume | 342/194 |

FOREIGN PATENT DOCUMENTS 2732643 1/1979 Fed. Rep. of Germany.

OTHER PUBLICATIONS

Cooley, J. W. and Tukey, J. W.; *An Algorithm for the Machine Calculation of Complex Fourier Series*; Reprinted from *Mathematics of Computation*; vol. 19; No. 90; pp. 297-301; 1965.

Weinstein, Clifford J.; *Short-Time Fourier Analysis and Its Inverse*; S. B., Mass. Institute of Tech.; pp. 2-3, 86-96; 1966.

(List continued on next page.)

*Primary Examiner*—John B. Sotomayor
*Attorney, Agent, or Firm*—Wood, Herron & Evans

[57] ABSTRACT

A police radar warning receiver includes a DSP circuit having a correlator, multiple array averager and a peak detector to provide after each sweep of a swept local oscillator respective dynamic thresholds associated with each averager array and against which information from that sweep is evaluated to determine whether to generate an alarm enable indicative of receipt of a police radar signal. The multiple averager arrays allow for different averaging or weighting ratios to maximize sensitivity of the receiver on the one hand and enhance response time on the other rather than trading off one for the other.

23 Claims, 1 Drawing Sheet

OTHER PUBLICATIONS

Halberstein; *Recursive, Complex Fourier Analysis for Real-Time Applications*; Proc. of the IEEE; p. 903; Jun. 1966.

Welch, P. D.; *The Use of Fast Fourier Transform for the Estimation of Power Spectra: A Method Based on Time Averaging Over Short, Modified Periodograms*; Reprinted from IEEE Trans. Audio Electroacoust; vol. AU-15; pp. 70-73; Jun. 1967.

Dillard, G. M.; *Recursive Computation of the Discrete Fourier Transform with Applications to an FSK Communication Receiver*; Naval Electronics Laboratory Center 1988.

Webb, R. C.; *IF Signal Sampling Improves Receiver Detection Accuracy*; Microwaves & RF; pp. 99-103; Mar. 1989.

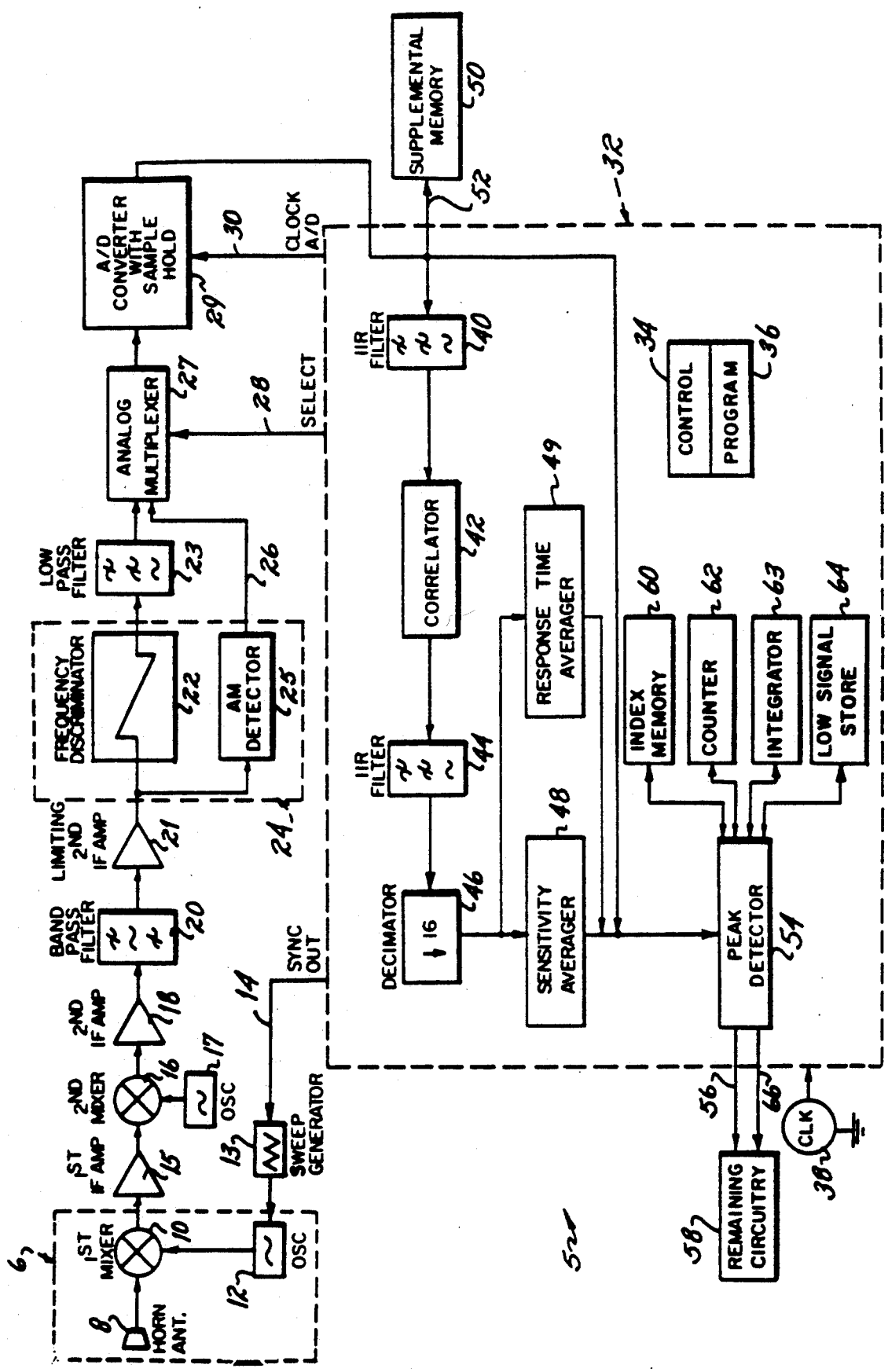

LONG RANGE POLICE RADAR WARNING RECEIVER WITH MULTIPLE ARRAY AVERAGING

RELATED APPLICATION

This application is a continuation-in-part of my copending application Ser. No. 07/558,668, filed Jul. 27, 1990, entitled "Long Range Police Radar Warning Receiver" now U.S. Pat. No. 5,044,885 which is a continuation of my application Ser. No. 07/481,509, filed Feb. 20, 1990 also entitled "Long Range Police Radar Warning Receiver" (now U.S. Pat. No. 4,954,828), and which is a continuation-in-part of my application Ser. No. 07/421,525, filed Oct. 13, 1989 similarly entitled "Long Range Police Radar Waring Receiver".

BACKGROUND OF THE INVENTION

I. Field of the Invention

The present invention is directed to an improvement in vehicle-mounted police radar warning receivers, and more particularly to such receivers which detect police radar signals before the vehicle is within the detection range of the police radar unit.

II. Description of the Prior Art

Police radar generally operates in the X-band and K-band of the frequency spectrum as discussed in U.S. Pat. No. 4,313,216, assigned to Cincinnati Microwave, Inc., the assignee herein. There are, generally, two types of police radar. One emits a continuous radar signal so long as the radar unit is turned on. The other emits a brief burst of radar signal when the police officer triggers the unit. This latter type is referred to as pulsed or instant-on radar. While transmitting, both continuous and pulsed radar transmit a signal which is at a fixed frequency within the selected band.

An electronic assembly referred to as a police radar warning receiver has been devised to detect the presence of police radar signals. The receiver is mountable in a vehicle, such as a passenger car or truck, motorcycle, boat or the like, which travels on land or water in areas subject to speed-monitoring radar surveillance by police, and functions to detect the presence of the police radar and provide the driver or user with an audible and/or visual indication that his speed is being checked by radar. The receiver is contained in a box-like housing which is set on the dash or clipped to the visor in the vehicle. Extending from the rear of the housing may be a power cord which terminates in a plug adapted to be received in the cigarette lighter socket of the vehicle. The front panel of the receiver faces the driver and has various indicators and control knobs.

When police radar is operating within range of the radar warning receiver, the circuitry of the receiver is able to detect the presence thereof. The ESCORT and PASSPORT radar warning receivers, manufactured by the assignee herein, Cincinnati Microwave, Inc. of Cincinnati, Ohio utilize a superheterodyne circuit for this purpose. As explained in aforementioned U.S. Pat. No. 4,313,216, and in U.S. Pat. Nos. 4,581,769 and 4,750,215, which are also assigned to the assignee herein, a superheterodyne circuit employs two local oscillators, one of which sweeps in frequency over a range of frequencies related to one or both radar bands. To this end, a first local oscillator signal is mixed with the incoming police radar or other signal to produce a first IF signal. The first IF signal is then mixed with the second local oscillator signal to produce a second IF signal. Due to the sweep of one of the local oscillators, the second IF signal presents a sweep pattern which extends over a band corresponding to the X and K bands and including noise and signals, the latter at locations in the sweep pattern corresponding to the frequency of received signals in the X and/or K bands.

The sweep pattern of the second IF signal is then passed through an FM discriminator circuit. The FM discriminator provides a second sweep pattern output including S-curves having positive- and negative-going portions to define time-related positions relative the start of the sweep corresponding to the frequency at which an incoming signal is received. As is well understood, such a heterodyning process will result in generation of a "duplicate" or image of the police radar signal within the receiver. Hence, the discriminator generates one S-curve related to the actual frequency signal received as well as a second S-curve related to the image frequency of the received signal. One or both of these S-curves may then be utilized to indicate reception of a police radar signal so as to alert an operator to the presence of police radar surveillance as described in aforementioned U.S. Pat. Nos. 4,581,769 and 4,750,215, and U.S. Pat. No. 4,862,175, also assigned to the assignee hereof.

The ability of radar warning receivers to detect police radar signals, however, is limited primarily by the sensitivity of the receiver electronic circuitry which defines a capture range. That is, signals emitted by police radar units may travel a substantial distance from the unit. As is well understood, the police radar signal must travel to the vehicle under surveillance and then return altered by a Doppler shift representing speed of the vehicle. However, as the police radar signal travels to and from the vehicle under surveillance, the weaker the signal becomes. Thus, the further the vehicle under surveillance is from the police radar unit, the weaker the return radar signal is such that at some distance and beyond, the police radar signal is too weak to return to the police radar unit and be evaluated for speed of the vehicle (detection range).

It is desirable that the radar warning receiver detect the police radar signal while it is still so weak as to be beyond the detection range of the police radar unit. However, as with the police radar unit, the further the police radar warning receiver is from the source of the police radar signal, the weaker the signal. At some distance from the police radar unit corresponding to the capture range of the police radar warning receiver, the police radar signal may be so weak that the police radar warning receiver is unable to distinguish signal from noise, meaning that a police radar signal will not be detected until the vehicle moves closer to the police radar unit. The difference in distance between the detection range of the police radar unit and the capture range of the police radar warning receiver defines a reaction zone during which the vehicle operator must react to the presence of a police radar signal. It is desirable that the reaction zone be as large as possible so that the operator of the vehicle under surveillance will have sufficient time to react before the vehicle comes within the detection range of the police radar unit.

Additionally, some police radar units are of the "instant-on" type meaning that they may be used in a manner to intermittently emit only short bursts of police radar signals. Where the bursts are given only infrequently, the first burst may be given when the police radar warning receiver is too far away to detect that burst, i.e., at that distance, the signal from the police radar unit is below the threshold of the receiver. The second burst may come after the vehicle is within the detection range of the police radar unit. Under such circumstances, the operator will have had no advance warning that the vehicle is under surveillance. Accordingly, it is desirable to extend the capture range of the police radar warning by providing the receiver with as much sensitivity, i.e., as low a threshold, as possible so that police radar signals may be received as far from the police radar unit's detection range as possible.

Typical of many radar warning receivers is that their sensitivity is generally low enough to be able to detect most police radar signals somewhat beyond the detection range of the associated police radar unit and, thus, provide a reaction zone. However, greater improvement is desired. One approach could be simply to select a lower threshold above which all signals are accepted as valid, thus extending the capture range. However, this approach may allow too much random noise to pass through the receiver circuitry and appear as police radar signals resulting in irritating and misleading false alarms. Another approach has been to continuously vary the threshold based on the level of random noise as a sweep of the local oscillator progresses. However, in such an approach, the threshold may be varied part way through the sweep but before a weak police radar signal is about to be received. Thus, if the threshold were caused to increase as the sweep progressed, the vehicle may be too far away to detect a weak police radar signal. As any signal not above the threshold is discarded, a police radar signal may be missed. Thus, rather than increase the range of the receiver, such an approach may actually reduce the capture range capabilities thereof, because the sensitivity of a receiver with such a varying threshold may be effectively, but undesirably, reduced. Alternately, the threshold may be caused to decrease to such a level that noise may lead to undue false alarms.

III. Description of Prior Applications

In my prior applications, Ser. Nos. 07/558,668; 07/481,509; and 07/421,525, the disclosures of which are incorporated herein by reference as if set out fully herein, I explained that sensitivity could be enhanced by processing the sweep pattern provided by digital correlation of the FM discriminator output and then peak detecting to evaluate the processed sweep pattern based upon a cumulative history of processed sweep patterns. The result was to average data over a plurality of sweeps and after each sweep generate a threshold level unique to the information content level of signals received over a plurality of sweeps whereby to adjust the sensitivity of the police radar warning receiver for maximum capture range under the circumstances. In that way, the capture range was improved over prior art police radar warning receivers while reducing the risk of missing a weak signal or causing undue false alarms which might result from continuously varying the threshold during a sweep.

As more fully described in my prior applications, during each sweep of the local oscillator, the FM discriminator output is digitally sampled at successive sample intervals to generate a series of digital sample words representative of the sweep pattern produced by the FM discriminator. Thus, the magnitude of each digital sample word corresponds to the magnitude of signals and noise received at the X- and/or K-band frequencies to which the receiver is tuned at the time the sample is obtained. As each sample word is generated, it is manipulated in the digital correlator by correlating each digital sample word and several of its predecessors in that sweep with a complex correlation function representative of the FM discriminator response to produce a series of complex digital correlator words having improved signal-to-noise ratio as compared to the sample words. The complex digital correlator words so produced are coupled to an averager which separately accumulates and averages for each sample interval or group of intervals the complex digital correlator word(s) generated in the same sample interval(s) over a plurality of sweeps of the local oscillator. The series or array of complex averager words thus obtained are converted to magnitude and represent the RF signal energy received in each of the sample intervals of the sweep. After each sweep, a peak detector calculates the mean square value of the series of the complex digital averager words whereby to provide a dynamic threshold for that sweep as affected by all of the previous sweeps. Also, after each sweep, the digital averager words in the array are examined by the peak detector against the current dynamic threshold whereby any averager word larger than the dynamic threshold is indicative of receipt of a police radar signal in that sample interval.

While the foregoing is believed generally to provide improved sensitivity over prior radar warning receivers, there was found to be an associated trade-off between response time and sensitivity based upon the ratio of averaging used. While it was desired to retain as much of the information from the prior sweep as possible for averaging, the optimum trade-off was believed to be a 0.9/0.1 weighting factor or ratio, where 10% of the value of the complex digital correlated word from a sample interval was to be added to 90% of the prior averaged value for that sample interval time from prior sweeps. As the ratio increased, sensitivity would likewise increase but response time would also be degraded. The substitution technique for large signed values described in my application Ser. No. 07/481,509 helped improve response time but further improvements were desired.

SUMMARY OF THE INVENTION

The present invention provides improved circuitry for and operation of a radar warning receiver which provides both enhanced sensitivity and improved response time so as to increase the available reaction zone without some of the drawbacks of threshold adjustment approaches of the prior art and without the tradeoff associated with my prior single averager array process. More specifically, I have discovered that providing a plurality of averager arrays, utilizing the same digital correlation words but different weighting ratios, allows for optimization of sensitivity and response time. To this end, and in accordance with the principles of the present invention, two or more sets of arrays of averager words are obtained from the same complex correlation words, each set based upon different weighting factors to optimize particular aspects of radar warning receiver performance. With two such sets, for example, one array may be based upon a very large weighting of old to new such as 0.95/0.05 or 0.98/0.02 for extremely good sensitivity, while the other array may have a lower weighting of old to new such as 0.50/0.50 to provide good response time in those areas where the first array is not as efficient. After each sweep, a dynamic threshold level may be calculated and peak detection accomplished for the first (sensitivity) array just as previously described in my prior applications. If an averager word in that array exceeds the associated dynamic threshold value, a police radar signal may have been received. However, if the sensitivity array does not yet indicate presence of a police radar signal, the reason may be due to a tradeoff in response time resulting from setting the first array weighting ratio for such good sensitivity. In accordance with my present invention, the second (response time) array is provided to enhance response time rather than sensitivity to eliminate the drawback associated with the single array tradeoff of my prior applications. To this end, the second array may similarly be evaluated for a dynamic threshold and then peak detected to determine whether there has been receipt of a police radar signal notwithstanding that no such signal was as yet indicated from the sensitivity array. Consequently, the highly averaged (larger weighting factor) sensitivity array will provide the desired improved sensitivity but the drawback of a tradeoff in response time is reduced or eliminated by the lightly averaged (lower ratio weighting) response time array. More than two averager arrays, each with a different weighting factor, may be utilized to provide the best response time for a segment of the total response time curve of the radar warning receiver.

By virtue of the foregoing, there is thus provided a radar warning receiver which has increased sensitivity along with enhanced response time relative to prior art receivers, and in which the capture range is maximized in view of the signal and noise conditions existing at the time a signal is received. Consequently, the radar warning receiver of the present invention is adapted to alert operators of a vehicle to the presence of police radar surveillance with a desirably large reaction zone, while reducing the risk that a weak police radar signal will be overlooked or false alarms will occur too often and be annoying or irritating.

These and other objects and advantages of the present invention shall be made apparent from the accompanying drawings and the description thereof.

BRIEF DESCRIPTION OF THE DRAWING

The accompanying drawing, which is incorporated in and constitutes a part of this specification, illustrates a preferred embodiment of the invention and, together with a general description of the invention given above, and the detailed description of the preferred embodiment given below, serves to explain the principles of the invention.

The FIGURE is a block diagram of a radar warning receiver according to the principles of the present invention.

DETAILED DESCRIPTION OF THE DRAWING

With reference to the FIGURE, there is shown a block diagram of a radar warning receiver 5 according to the principles of the present invention. Pulsed or continuous signals occurring in the X-band or K-band are received by an antenna system 6 which includes horn antenna 8 coupled to first mixer 10 to which the signals received by horn antenna 8 are directed. Horn antenna 8 may include filters for preventing signals at unwanted frequencies from being passed to first mixer 10, and it may further include other filters for preventing outward radiation therefrom of internally generated radio frequency signals. Coupled to first mixer 10 is a variable frequency first local oscillator 12 adapted to be swept in frequency over a range of frequencies as described in aforementioned U.S. Pat. No. 4,313,216, the disclosure of which is incorporated herein by reference. First mixer 10 and first local oscillator 12 may be built into and made a part of antenna system 6 as provided in the ESCORT or PASSPORT radar warning receivers available from Cincinnati Microwave, Inc., the assignee herein, the latter as described in U.S. Pat. No. 4,613,989. The disclosure of said U.S. Pat. No. 4,613,989 is incorporated herein by reference. The oscillator disclosed in U.S. Pat. No. 4,583,057, also assigned to the assignee herein, may be utilized for local oscillator 12. The disclosure of said U.S. Pat. No. 4,583,057 is incorporated herein by reference.

The frequency of the oscillator signal generated by local oscillator 12 varies, i.e., it is swept, across a predetermined band of frequencies by a sweep generator 13 which causes the local oscillator signal to vary from a first frequency to a second frequency in a controlled manner in response to receipt of a sync pulse on sync out line 14. The varying frequency signal generated by local oscillator 12 is mixed with received signals from horn antenna 8 in first mixer 10 to generate first IF signals which are coupled to first IF amplifier 15. The output of amplifier 15 is coupled to a second mixer 16 such as a SAW mixer whereat the first IF signals are mixed with a fixed frequency oscillator signal from second local oscillator 17 to produce second IF signals which are amplified by second IF amplifier 18. The frequency of oscillator 17 is selected so that during the sweep of oscillator 12, any received signal in the desired band(s) mixed with the signal from oscillator 12 will generate two IF signals, one being a primary and one being an image as is well understood. The output of amplifier 18 is coupled through bandpass filter 20 and limiting second IF amplifier 21 to frequency discriminator circuit 22. The output of discriminator 22 is coupled to low pass filter 23 which preferably has a corner frequency of less than 8 KHz and more preferably about 6 KHz. Operation of the foregoing is generally as described in aforesaid U.S. Pat. No. 4,313,216, although the sweep rate preferably is doubled to 16 Hz (and the sweep period reduced to 62.5 ms) to further improve response time.

FM discriminator 22 is preferably part of an FM receiver IF 24 (such as an LM3089 available from National Semiconductor Corporation, Santa Clara, Calif.; or an NE604 available from Signetics Corporation, Sunnyvale, Calif.) and includes an AM detector 25 driven by the same IF output from amplifier 21 to produce another analog signal on output 26 corresponding to the strength of the signal received at the frequency to which receiver 5 is tuned at that time.

The output of low pass filter 23 is coupled to a first input of analog multiplexer 27. Similarly, the AM output 26 of IF 24 is coupled to a second input of analog multiplexer 27. In a first state of multiplexer 27, as determined by the state of select signal 28, filter 23 output is coupled to analog-to-digital (A/D) converter 29 whereas, in a second state of multiplexer 27, output 26 is coupled to A/D converter 29 for purposes to be described hereinafter. Low pass filter 23 also has gain in the pass band which is set such that the noise level from frequency discriminator 22 is nearly full-scale into A/D converter 29. A/D converter 29 includes a sample hold storage buffer which stores the input signal in response to a clock A/D signal 30.

In the first state of multiplexer 27, A/D converter 29 produces a digital word corresponding to the level of the output from FM discriminator 22 at any given instant of time. As each sweep of oscillator 12 progresses, A/D converter 29 samples the FM discriminator output at sample intervals as dictated by clock A/D pulse 30 to produce a series of digital sample words, each corresponding to the magnitude of RF energy received by antenna 8 at the frequency or frequencies to which receiver 5 is tuned by oscillator 12 at that interval.

Preferably, a sample rate of about 119 KHz is used to produce 7,486 digital sample words in each sweep, each sample word preferably comprised of six bits. As they are generated, sample words from the output of A/D converter 29 are sequentially coupled to DSP circuit 32, such as a DSP56000 or DSP96002 integrated circuit available from Motorola Semiconductors, Inc. DSP circuit 32 includes a control section 34 which causes the DSP circuit 32 to perform a series of programmed instructions stored in program memory 36 in sequence with pulses from system clock 38 by which to control timing and communication within DSP circuit 32, as is well understood. Control section 34 also causes generation of the pulse 14 to sweep generator 13 which initiates a sweep of local oscillator 12 such that operation of DSP circuit 32 is synchronized to the sweep. Control section 34 further causes generation of the appropriate select 28 followed by a conversion request (clock A/D 30) to converter 29 by which to determine the nature and timing of signals input to DSP circuit 32. DSP circuit 32 is programmed in accordance with the principles of the present invention to advantageously maximize the sensitivity of receiving and minimize response time under the signal and noise conditions prevailing at the time, as will now be described.

Each digital sample word generated at each sample interval is coupled to a software recursive infinite impulse response (IIR) low pass filter 40 to produce a filtered sample word for each sample word generated. Low pass IIR filter 40 has at least a second order s-domain low pass transfer function as follows:

$$H(s) = \frac{f_c^2}{s^2 + df_c s + f_c^2} \quad (1)$$

where d is the filter damping function (preferably equal to about 1.414214), and $f_c$ is the filter cutoff frequency (point at which the filter gain is equal to 1/d—preferably equal to about 350 Hz). Alternatively, filter 40 could be a band pass IIR filter having the transfer function:

$$H(s) = \frac{ds}{s^2 + df_c s + f_c^2} \quad (2)$$

The output of IIR filter 40 is coupled to complex correlator 42 which utilizes a Discrete Fourier Transform to correlate the current filtered sample word and the previous 127 filtered sample words with a series of complex or correlation function words representative of the response of FM discriminator 22 to provide improved signal-to-noise ratio, as is well understood. The preferred correlation function is $$e^{-j2\pi k/128} = \cos\frac{2\pi k}{128} - j\sin\frac{2\pi k}{128},$$

although other correlation functions may be used.

Correlator 42 preferably correlates the filtered sample words according to the formula (3):

$$H_{L+1}\left(\frac{1}{NT}\right) = e^{+j2\pi L/N} \cdot H_L\left(\frac{1}{NT}\right) + h(LT) - h((L-N)T)$$

where N=128 points, L=point index, T=1/sample rate (e.g., =1/119791), so as to produce on its output a complex correlator word as each new filtered sample word is input thereto. It will be appreciated that as each sweep first progresses, there will be fewer than 127 filtered sample words available for purposes of the correlation, i.e., there will be several missing words during the earliest portion of the sweep. As each sample interval occurs in the sweep, more of the missing words will be supplied, but until they are, they are assumed equal to zero.

To reduce the number of digital words to be dealt with by the remainder of DSP circuit 32, it is preferred to decimate the complex correlator words generated by correlator 42. To this end, the complex correlator words produced by correlator 42 are coupled to a complex IIR low pass filter 44 including a pair of IIR filters identical to IIR filter 40 (one for the real components and one for the imaginary components of the complex correlator words). The outputs of complex IIR low pass filter 44 are decimated by sixteen in decimator 46 whereby to produce approximately 467 complex digital decimator words through the course of the sweep containing the pertinent contents of the data in the original 7,400 plus complex words. Preferably, the function of decimator 46 is provided merely by providing only every sixteenth complex word output of filter 44 to averager 48, whereby each decimator 46 output represents primarily the magnitude of RF signal energy within the group of 16 undecimated sample intervals (i.e., the frequency segment). The contribution of RF noise in each frequency segment is minimized as a result of correlator 42. The foregoing is generally as described in my prior applications referred to hereinabove although the number of sample points and decimation rate is altered for the doubled sweep rate.

In order to process the data as desired, each sweep is broken into about 400 segments representing continuous segments of frequency within the RF band(s) of interest, with each segment assigned a set of index numbers related to the number of averager arrays to be utilized. As each decimator word is generated for each index, a plurality of averager words are calculated based upon a plurality of weighting ratios, resulting in a plurality of averager word arrays for each sweep. In the embodiment described herein, two such arrays are provided. Hence, two averager words are computed for each decimator word to provide a first array which enhances sensitivity of the receiver 5 and a second array which minimizes response time of receiver 5, respectively. To this end, as each decimator word is generated, an averager word of the first array is computed by sensitivity averager 48 utilizing a high weighting ratio of old to new to maximize sensitivity and an averager word of the secondary array is then computed by response time averager 49 utilizing a lower weighting ratio of old to new to minimize response time. Consequently, two arrays of averager words will be produced for each sweep of Osciallator 12. For purposes of the two array embodiment, each frequency segment is assigned an associated pair of index numbers $I_s$ and $I_R$ for the sensitivity averager array and the response time averager array, respectively. More arrays may be used and the index numbers I1, $I_2...I_n$ may be assigned where I is the index or frequency segment and n indicates the array number.

With respect to sensitivity averager 48, as each decimator word is generated, averager 48 causes a small percentage of the decimator word value (such as not more than about 5% or, preferably, as little as 2%) to be stored in a memory location associated with its respective sensitivity index number ($I_S$) in a page of a supplemental memory 50 exterior of DSP circuit 32, along with a very large percentage (such as 95% or, preferably, as much as 98%) of the value previously stored in that same location. Similarly, with respect to response time averager 49, as each decimator word is generated, averager 49 causes a relatively large percentage of the decimator word value (preferably at least about 50%) to be stored in a memory location associated with its respective response time index number ($I_R$) in the page of supplemental memory 50, along with a relatively large percentage (preferably about 50%) of the value previously stored in that same location. In each case, of averagers 48 and 49, the percentages of old and new preferably equal 100%. To facilitate the averager processes and for other purposes to be described, memory 50 communicates over bidirectional bus 52 with averagers 48 and 49, A/D converter 29, and peak detector 54, as needed in response to control 34 and program 36 of DSP circuit 32.

To conserve memory capacity, I have also discovered that only a portion of the second array averager words needs to be stored in memory 50. To this end, in the first array, the averager words are 24 bits long (stored, for example, in three 8 bit words in memory 50) to provide the desired arithmetic precision. However, such precision is not necessary for the lower weighting situation as there is less signal "build-up" with each sweep. Consequently, I have found that only the highest 16 order bits of the 24 bit averager words calculated for the second array need to be stored in memory locations $I_R$ (such as in two 8 bit words) thereby reducing the amount of extra memory required for the second array by about ⅓ as compared to the first array.

The resulting accumulated or average value in each location $I_R$ and $I_S$ of memory 50 is a complex digital word referred to herein as an averager word, there being two averager word locations for each frequency segment. Thus, as the very first sweep progresses, the two memory locations for each index number will start with zero and thereafter a digital word having a value preferably equal to 2% of the associated decimator word will be added to location $I_S$ and a digital word having a value preferably equal to 50% of the associated decimator word will be added to location $I_R$. Thereafter, in each sweep, the averager word in each memory location $I_S$ will be updated or accumulated by averager 48 as described above (2% new, 98% old) and the averager word in each memory location $I_R$ will be updated or accumulated by averager 49 as described above (50% new, 50% old). Also as each complex averager word is determined, a value corresponding to the averager word is determined (e.g., by the sum of squares) to produce associated arrays of real averager words. The averager magnitude words for each array during each sample interval are also stored in memory locations associated with their respective index numbers $I_R$ and $I_S$, such as on a second page of memory 50.

The magnitude of the words stored in locations $I_S$ will tend to increase in response to received RF signals in that segment of frequency while tending to further minimize and even cancel contribution from RF noise in that segment whereby to improve signal-to-noise ratio and, hence, the sensitivity of receiver 5. Due to the averaging process with a large weighting ratio, however, it is possible that relatively strong police radar signals may not generate sufficient contribution to the averaging process to drive the averager magnitude in the first array above the associated dynamic threshold as quickly as would be desired, i.e., response time to relatively strong police radar signals may be too long. Transient response of receiver 5 is thus delayed by the sensitivity array averaging process suggesting that a different ratio of old to new should be used in the averager. That is, more of the new should be added to less of the old. However, the signal-to-noise ratio of the averaging process is adversely affected by increasing the contribution of new sweep values. Thus, rather than increase the contribution of new correlator words, it is preferred to reduce same. The first array averaging process does so but at the expense of response time.

A solution to the transient response problem brought about by the averaging process was described in my prior application, Ser. No. 07/481,509, involving substitution of selected averager magnitude words with the magnitude of the decimator words under certain circumstances related to strong signals. However, I have found that the expediency of a second (or multiple) averager array with a weighting factor selected to enhance response time rather than sensitivity will provide better results than the substitution technique of that prior application.

After each sweep of oscillator 12 is concluded, the contents of supplemental memory 50 related to the arrays are evaluated by peak detector 54 to determine for that sweep a dynamic threshold associated with each averager array and to locate received signals in the sweep which may be indicative of a police radar signal at antenna 8. In this regard, peak detector 54 calculates a digital threshold word representing the mean square magnitude of the first array of averager words stored in supplemental memory 50 by summing the real components (magnitude squared) in all of the associated averager magnitude word memory locations $I_S$, dividing the sum by the number of memory locations involved, and multiplying by a constant $K_S$. The constant $K_S$ is determined empirically based upon a tradeoff between sensitivity and false alarm rate and is equal to 14 in a preferred embodiment. Similarly, peak detector 54 calculates a digital threshold word representing the mean square magnitude of the second array of averager words stored in supplemental memory 50 by summing the real components (magnitude squared) in all of the associated averager magnitude word memory locations $I_R$, dividing the sum by the number of memory locations involved, and multiplying by a constant $K_R$. $K_R$ could be higher than $K_S$ to account for the lower signal-to-noise ratio of the second array as compared to the first array, however, in a preferred embodiment, $K_R$ is also equal to 14.

Peak detector 54 then examines the magnitude squared in each of the above-described second page of memory locations $I_S$ and $I_R$ of supplemental memory 50 to determine whether the magnitude of the averager word in an array for any segment exceeds the dynamic threshold associated with that array. Theoretically, whenever the magnitude squared (real component) of any word in an averager array exceeds the dynamic threshold associated with that array, a police radar signal may have been received. Accordingly, if any such segment meets the associated criterion (its averager word value exceeds the associated dynamic threshold), an alarm enable signal may be output from DSP circuit as at 56 to remaining circuitry 58 to generate audible and/or visually perceptible alarms as desired to alert an operator of the vehicle (not shown) to the presence of police radar surveillance.

For very weak police radar signals, the first array averager process will provide receiver 5 with enhanced sensitivity to allow detection of such signals with a very large capture range. Similarly, for very strong police radar signals, where the first array averager process would be too slow to respond, the second array averager process is provided for enhanced capture range. Further averager array processes may be provided to improve capture range under various signal conditions. As a consequence, both weak police radar signals and strong police radar signals will be detected with as much capture range as is believed possible and without trading off performance for one type of condition (e.g. weak signal) for another (e.g. strong signal).

Selection of the dynamic threshold for each array as described above by which signals may be accepted as indicating receipt of a police radar signal greatly reduces falsing problems possible with prior art approaches and generally allows the lowest possible threshold setting (and consequently, the best possible sensitivity) under the signal and noise conditions then-existing. Under conditions in which a multitude of signals appear, the dynamic threshold associated with an array might actually exceed the value of each of the averager words in that array. To minimize the risk of missing a police radar signal under those conditions, peak detector 54 is further programmed to constrain the dynamic threshold for each array within limits such that if the calculated dynamic threshold for that array exceeds a predetermined maximum, it is set equal to that maximum. For the sensitivity array, the maximum is preferably 0.003052 or −25.15 dB relative to full scale. A maximum dynamic threshold for the response time array is not always required but, if used, would be 0.183105 or −7.37 dB. Similarly, in situations where there are very few signals, the threshold may go so low as to allow noise alone to cause an averager word to exceed the associated threshold. To this end, if the threshold is below a predetermined minimum, it is set equal to that minimum to minimize false alarms under such conditions. The predetermined minimum for the sensitivity array is preferably 0.0003052 (−35.15 dB relative to full scale). Similarly, the minimum for the response time array is in the range of 0.0146 to 0.0256 (−18.36 dB to −15.92 dB) and is preferably selected as low as possible (e.g. 0.0183105 or −17.37 dB) in that range without creating a problem with false alarms.

Preferably, and to avoid the possibility of false alarms due, for example, to interference from variable frequency signal sources such as superhomodyne radar warning receivers operating in the vicinity of receiver 5, DSP circuit 32 includes an index memory 60 which operates in conjunction with peak detector 54 to provide sweep-to-sweep comparison for false alarm elimination in a fashion similar to that provided by the circuit shown in U.S. Pat. No. 4,581,769 assigned to the assignee hereof. Aforesaid U.S. Pat. No. 4,581,769 is incorporated herein by reference.

Rather than provide the alarm enable signal merely because one or more averager words in an array exceed the associated dynamic threshold, it is preferred to not generate the alarm enable signal until a match is found in index numbers exceeding the associated dynamic threshold in two consecutive sweeps, for example. To this end, after a given sweep, the index numbers of those segments whose averager word exceeded the associated dynamic threshold may be stored in memory 60. Thereafter, on the next sweep, the index number of each segment exceeding the newly-calculated dynamic threshold may be compared to the index numbers stored in memory 60. A match between any such index number from the present sweep and a stored index number from the prior sweep provides confirmation that an actual police radar signal was likely received and the alarm enable signal may be placed on output 56 as previously described.

To allow for variations due to instabilities in receiver 5 and the like, DSP circuit 32 is programmed to allow some margin in comparing segments from sweep to sweep. For example, if segment number $6_S$ (or, for example, $30_R$) in sweep A had an averager word value which exceeded the dynamic threshold for the sensitivity array in sweep A, and in sweep B it was the averager word segment $7_S$ (or, for example, $31_R$) which exceeded the dynamic threshold calculated from the sensitivity array in sweep B, an alarm would still be given. Thus, the sweep-to-sweep segment comparisons allow for some mismatch to still be deemed a valid signal. The amount of mismatch is preferably plus or minus 5 segments. After the sweep-to-sweep comparison, the index numbers of the averager words exceeding their associated dynamic threshold in the present sweep may be stored in memory 60 in place of the previously stored index numbers.

Due to limitations in the amount of memory available in memory 60, as well as the amount of time available to do all of the calculations, it may be possible to maintain no more than a few of the index numbers of segments from a given sweep for comparison to the results of the next sweep. It is believed that storing no more than six index numbers/array of those segments having averager word magnitudes exceeding the associated dynamic threshold is sufficient to provide satisfactory operation of receiver 5. Thus, if seven such segments from an array satisfy the criteria, the index numbers for only the six largest averager words in that array (those which exceed the associated dynamic threshold by the most) will be stored for use in the subsequent sweep, whereas if fewer than six test positive, only the index numbers for those fewer number of segments will be stored. Alternatively, it has been found that the validity of the comparison is not hampered if the index numbers of the six segments having the largest averager word magnitude, irrespective of whether they exceed the associated dynamic threshold, are stored from a first sweep for comparison to the results of a second sweep. In this regard, if the index numbers of any segment in the present sweep whose averager word values exceed the associated dynamic threshold match a stored index number (within the above-described tolerance), even though the averager word value for that same segment did not exceed the associated dynamic threshold in the prior sweep, a match is found and an alarm enable provided.

Because police radar operates in more than one band, it is desirable to know the band in which the signal is received. Thus, for example, it is useful to know whether the police radar unit emitting the received signal is operating in the X-band or the K-band. To this end, assuming that the sweep-to-sweep comparison is positive, peak detector 54 evaluates the spacing between those segments (up to six) which have an averager word magnitude exceeding the associated dynamic threshold in the current sweep to determine whether the alarm enable should indicate X- or K-band. As a result of generation of an image signal when the local oscillator is swept, at least one pair of averager words in an array having a predetermined difference in index numbers should be produced having magnitudes exceeding the associated dynamic threshold for each signal received. The index numbers for all of the six or fewer segments which are retained for an array after the current sweep are investigated for their spacing. The index numbers are paired and, if it is possible to pair them up such that the index numbers in each pair are spaced apart approximately 35 ($\pm$7) segments, then the alarm enable signal will indicate that a K-band alarm is to be given. If, however, two of the segments in any pair are separated by approximately 70 ($\pm$13) segments, the above-pairing for K-band is not possible, or only one averager word in the array exceeds the associated threshold, then the alarm enable signal will indicate that an X-band alarm is to be given. Of course, the comparison is between index numbers associated with the same array; the relationship or spacing between an $I_S$ index number and an $I_R$ index number stored in memory 60 is not evaluated.

Additionally, certain rules may be applied where there is a conflict in alarm enable between the two arrays. For example, if the alarm enable results from second averager data, and thereafter, but during the alarm condition, an alarm enable results from the first averager, the alarm enable (and thus peak detection and band determination) will be made from the second averager for two seconds and thereafter from the data provided by the first averager. Conversely, if the alarm enable is first provided by the first averager array, then throughout that alarm condition, the alarm enable is to be made from that first array and the second array essentially ignored. Finally, if both arrays first provide an alarm enable after the same sweep, they are to be treated as if the second array gave the first enable for two seconds as described in the former situation.

Additionally, an alarm enable (preferably for an X-band alarm) may be provided for police radar signals that are too weak to cause an averager word for either array to exceed the associated dynamic threshold. This weak signal alarm enable is provided in the event that one or two of the same averager words in the sensitivity array otherwise present the largest magnitude for an extended period of time, such as two seconds. For this purpose, in any sweep where no index numbers are selected which match any index number stored in memory 60 from the prior sweep as described above, a counter 62 and an integrator 63 are reset by peak detector 54. Also, the index number of the two averager words in the sensitivity array having the largest magnitude (irrespective of their relationship to the associated threshold) are stored in low signal store or memory 64. For each sweep thereafter, if no matches occur between the index numbers selected in that sweep and the index numbers stored in memory 60 from the prior sweep as described earlier, counter 62 is either incremented or reset and integrator 63 is either updated or reset. The counter is incremented if, in that sweep, the index number of either of the two averager words with the largest magnitude in that sweep match one of the two index numbers stored in memory 64 when counter 62 was last reset. Similarly, the value in the integrator 63 is summed with the largest averager word from that sweep. If, as a result of such operation over a plurality of sweeps, integrator 63 sums up to a predetermined value (e.g., exceeding ten times the minimum dynamic threshold limit for the sensitivity array) and counter 62 counts up to a predetermined number (corresponding to about two seconds worth of sweeps) without resetting, peak detector 54 will provide an alarm enable irrespective of whether the two averager words involved are above or below the associated dynamic threshold. If, in any sweep, no match occurs from either of memory 60 or memory 64, counter 62 and integrator 63 are again reset and two new index numbers will be stored in memory 64 based on the results of that sweep.

As is well understood, remaining circuitry 56 of receiver 5 may provide an audible alarm (not shown) which beeps at a rate proportional to the strength of a received signal when alarm enable 56 is provided. Similarly, an LED bar graph (not shown) functioning as a signal strength meter may be employed to show visually that same signal strength. To this end, at each sample interval, analog multiplexer 27 is caused to switch between the first and second state by select signal 28 so as to provide at each sample interval (1) a digital sample word from FM discriminator 22 to be processed as previously described, and (2) a digital AM word which is routed to and stored in a secondary memory location in supplemental memory 50 corresponding to the sample interval. In conjunction with provision of an alarm enable 56 (resulting from a positive sweep-to-sweep match, for example), the digital AM word stored in supplemental memory 50 at a location corresponding to the index number of the largest averager word in that sweep is routed through peak detector 54 to remaining circuitry 58 over AM line 66. That AM word corresponds to the amplitude of the signal received in that sample interval and, thus, may be utilized to control the beep rate of the audible alarm and/or the LED bar graph display. Although not shown, output 26 of AM detector 26 may be amplified such that the LED bar graph just barely begins to display intensity at full signal when receiver 5 is exposed to a calibrated police radar signal reference.

While the present invention has been illustrated by the description of an embodiment thereof, and while the embodiment has been described in considerable detail, it is not the intention of applicant to restrict or in any way limit the scope of the appended claims to such detail. Additional advantages and modifications will readily appear to those skilled in the art. For example, multiple as opposed to dual averager arrays may be used. Also, the second (or subsequent) array may be ignored when the peak detection sequence for the sensitivity array indicates possible reception of a police radar signal. Furthermore, if the memory and calculation capacity of the DSP circuit utilized is sufficient, it may be possible to dispense with complex IIR filter 44 and decimator 46 and, thus, provide sufficient memory locations in supplemental memory 50 to accumulate all the correlator output words produced by correlator 42 for purposes of operation of peak detector 54 as described above. Indeed, IIR filters 40 and 44 could alternatively be finite impulse response filters. The invention in its broader aspects is therefore not limited to the specific details, representative apparatus and method, in the illustrative example shown and described. Accordingly, departures may be made from such details without departing from the spirit or scope of applicant's general inventive concept.

What is claimed is:

1. A police radar warning receiver comprising:
    receiver means for producing a sweep pattern as an oscillator signal is swept in frequency between a first frequency and a second frequency in response to mixing of received RF signals in at least one band of police radar signal frequencies with said swept oscillator signal;
    circuit means responsive to the receiver means for producing at various intervals over each sweep of the oscillator signal a respective magnitude word, each magnitude word being a relative measure of signal energy at a respective interval;
    first averager means for accumulating with respect to each of at least a plurality of said intervals and in accordance with a first weighting factor, a first average of the magnitude word associated with a said interval over a plurality of sweeps of the oscillator signal whereby to produce a first array of averager words;
    second averager means for accumulating with respect to each of at least a plurality of said intervals and in accordance with a second weighting factor, a second average of the magnitude word associated with a said interval over a plurality of sweeps of the oscillator signals whereby to produce a second array of averager words; and
    alarm enable means responsive to said first and second averager means for providing an alarm enable if, after a given sweep of the oscillator signal, either (1) a first averager word in said first array meets at least a first criterion, or (2) a second averager word in said second array meets at least a second criterion, whereby to indicate receipt of a police radar signal.

2. The police radar warning receiver of claim 1, said first weighting factor being selected to provide enhanced sensitivity relative said second weighting factor.

3. The police radar warning receiver of claim 1, said second weighting factor being selected to provide enhanced response time relative said first weighting factor.

4. The police radar warning receiver of claim 1, said first criterion being a dynamic threshold word corresponding to the magnitude of all of said first averager words in said first array, said first criterion being satisfied by a first averager word in said first array having a magnitude greater than said dynamic threshold word.

5. The police radar warning receiver of claim 1, said second criterion being a dynamic threshold word corresponding to the magnitude of all of said second averager words in said second array, said second criterion being satisfied by a second averager word in said second array having a magnitude greater than said dynamic threshold word.

6. The police radar warning receiver of claim 1, said circuit means including:
    sampler means for repeatedly sampling at intervals said sweep pattern as it is produced whereby to produce a series of digital sample words each associated with a respective interval;
    correlator means for correlating each digital sample word as it is produced with a plurality of proceeding said digital sample words and a complex correlator function whereby to provide for each said interval a said magnitude word.

7. The police radar warning receiver of claim 6 further comprising digital filter means between said sampler means and said correlator means whereby to filter each said digital sample word before it is correlated by said correlator means.

8. The police radar warning receiver of claim 1 including first index means for storing a first set of index numbers associated with a plurality of the averager words of at least one of the arrays satisfying the criterion associated with that array after a first sweep of the oscillator signal, second index means for obtaining a second set of index numbers associated with a plurality of the averager words of the at least one array satisfying the criterion associated with that array after a second sweep of the oscillator signal, and means for permitting provision of said alarm enable whenever the second set of index numbers associated with the at least one array corresponds in a predetermined manner to the first set of index numbers associated with that array whereby to reduce likelihood of false alarms.

9. The police radar warning receiver of claim 1 including first index means for storing a first set of index numbers associated with a plurality of the averager words of each array satisfying the criterion associated with the array after a first sweep of the oscillator signal, second index means for obtaining a second set of index numbers associated with a plurality of the averager words of each array satisfying the criterion associated with the array after a second sweep of the oscillator signal, and means for permitting provision of said alarm enable whenever the second set of index numbers associated with a said array corresponds in a predetermined manner to the first set of index numbers associated with that array whereby to reduce likelihood of false alarms.

10. The police radar warning receiver of claim 1, said circuit means including:
    sampler means for repeatedly sampling at sample times said sweep pattern as it is produced whereby to produce a series of digital sample words each associated with a respective sample time;
    correlator means for correlating each digital sample word as it is produced with a plurality of proceeding said digital sample words and a complex correlator function whereby to provide a series of complex digital correlator words each associated with a respective sample time;
    digital filter means responsive to said correlator means to produce a filtered complex correlator word for each complex correlator word;
    decimator means responsive to said digital filter means for decimating groups of said filter complex correlator words associated with groups of said sample times to produce a said magnitude word for each said group of sample times.

11. A method of detecting a police radar signal comprising:

repeatedly sweeping an oscillator between a first frequency and a second frequency;

producing a sweep pattern by mixing received RF signals in at least one band of police radar signal frequencies with said sweeping oscillator signal;

producing at various intervals over each sweep of the oscillator signal a respective magnitude word, each said magnitude word being a relative measure of signal energy at a respective interval;

accumulating with respect to each of at least a plurality of said intervals and in accordance with a first weighting factor, a first average of the magnitude word associated with a said interval over a plurality of sweeps of the oscillator signal whereby to produce a first array of averager words;

accumulating with respect to each of at least a plurality of said intervals and in accordance with a second weighting factor, a second average of the magnitude word associated with a said interval over a plurality of sweeps of the oscillator signal whereby to produce a second array of averager words;

providing, after a given sweep of the oscillator signal, an alarm enable if either (1) first averager word in said first array meets a first criterion, or (2) a second averager word in said second array meets a second criterion, whereby to indicate receipt of a police radar signal.

12. The method of claim 11, further comprising selecting said first weighting factor to provide enhanced sensitivity relative said second weighting factor.

13. The method of claim 11, further comprising selecting said second weighting factor to provide enhanced response time relative said first weighting factor.

14. The method of claim 11, further comprising determining said first criterion by providing, after the given sweep of the oscillator signal, a dynamic threshold word corresponding to the magnitude of all of said first averager words in said first array, and wherein said first criterion is satisfied by a first averager word in said first array having a magnitude greater than said dynamic threshold word.

15. The method of claim 11, further comprising determining said second criterion by providing, after the given sweep of the oscillator signal, a dynamic threshold word corresponding to the magnitude of all of said second averager words in said second array, and wherein said second criterion is satisfied by a second averager word in said second array having a magnitude greater than said dynamic threshold word.

16. The method of claim 11, said magnitude signals being produced by repeatedly sampling at intervals said sweep pattern as it is produced whereby to produce a series of digital sample words each associated with a respective interval, and correlating each digital sample word as it is produced with a plurality of preceding said digital sample words and a complex correlation function whereby to provide for each said interval a said magnitude word.

17. The method of claim 16 further comprising digitally filtering each said digital sample word before it is correlated.

18. The method of claim 15 further comprising storing a first set of index numbers associated with a plurality of the averager words of at least one of the arrays satisfying the criterion associated with that array after a first sweep of the oscillator signal, obtaining a second set of index numbers associated with a plurality of the averager words of the at least one array satisfying the criterion associated with that array after a second sweep of the oscillator signal, and permitting provision of said alarm enable whenever the second set of index numbers associated with the at least one array corresponds in a predetermined manner to the first set of index numbers associated with that array whereby to reduce likelihood of false alarms.

19. The method of claim 15 further comprising storing a first set of index numbers associated with a plurality of the averager words of each array satisfying the criterion associated with that array after a first sweep of the oscillator signal, obtaining a second set of index numbers associated with a plurality of the averager words of each array satisfying the criterion associated with that array after a second sweep of the oscillator signal, and permitting provision of said alarm enable whenever the second set of index numbers associated with a said array corresponds in a predetermined manner to the first set of index numbers associated with that array whereby to reduce likelihood of false alarms.

20. The method of claim 11, said magnitude signal provided by:

repeatedly sampling at sample times said sweep pattern as it is produced whereby to produce a series of digital sample words each associated with a respective sample time;

correlating each digital sample word as it is produced with a plurality of preceding same digital sample words in a complex correlation function whereby to provide a series of complex digital correlator words each associated with a respective sample time;

producing a filter complex correlator word for each complex correlator word;

decimating groups of said filter complex correlator words associated with groups of said sample times to produce a said magnitude word for each said group of sample times.

21. A police radar warning receiver comprising:

receiver means for producing a sweep pattern as an oscillator signal is swept in frequency between a first frequency and a second frequency in response to mixing of received RF signals in at least one band of police radar signal frequencies with said swept oscillator signal;

circuit means responsive to the receiver means for producing at various intervals over each sweep of the oscillator signal a respective magnitude word, each magnitude word being a relative measure of signal energy at a respective interval;

a plurality of averager means each for accumulating, with respect to each of at least a plurality of said intervals and in accordance with an associated weighting factor, an average of the magnitude word associated with a said interval over a plurality of sweeps of the oscillator signal whereby to produce a plurality of arrays of averager words; and alarm enable means responsive to said plurality of averager means for providing an alarm enable if, after a given sweep of the oscillator signal, an averager word in at least a selected one of said arrays meets at least a first criterion, whereby to indicate receipt of a police radar signal.

22. A police radar warning receiver comprising:

receiver means for producing a sweep pattern as an oscillator signal is swept in frequency between a first frequency and a second frequency in response to mixing of received RF signals in at least one band of police radar signal frequencies with said swept oscillator signal;

circuit means responsive to the receiver means for producing at various intervals over each sweep of the oscillator signal a respective magnitude word, each magnitude word being a relative measure of signal energy at a respective interval;

first averager means for accumulating over a plurality of sweeps of the oscillator signal not more than about 5% of the value of the magnitude word in each sweep associated with at least one said interval;

second averager means for accumulating over a plurality of sweeps of the oscillator signal not less than about 50% of the value of the magnitude word in each sweep associated with at least one said interval, and;

alarm enable means responsive to said first and second averager means for providing an alarm enable if, after a given sweep of the oscillator signal, the accumulated value in one of said averager means meets a criterion associated with that averager means, whereby to indicate receipt of a police radar signal.

23. The police radar warning receiver of claim 22 wherein each said averager means accumulates respective values of the magnitude word for a plurality of said intervals, said criterion being a dynamic threshold value corresponding to the magnitude of all of said accumulated values in said one array, said criterion being satisfied by an accumulated value in said one array having a magnitude greater than said dynamic threshold word.

* * * * *